United States Patent [19]

Larkin

[11] Patent Number: 4,552,862

[45] Date of Patent: Nov. 12, 1985

[54] STABILIZED HYDROGENATION CATALYST AND METHOD OF FORMING THE CATALYST

[75] Inventor: John M. Larkin, Austin, Tex.

[73] Assignee: Texaco Inc., White Plains, N.Y.

[21] Appl. No.: 473,168

[22] Filed: Mar. 7, 1983

[51] Int. Cl.[4] .................. B01J 23/14; B01J 23/72; B01J 23/80; B01J 23/86

[52] U.S. Cl. .................. 502/306; 502/310; 502/527

[58] Field of Search ............... 502/306, 310, 335, 527

[56] References Cited

U.S. PATENT DOCUMENTS

| | | | |
|---|---|---|---|
| 2,116,552 | 5/1938 | Arnold et al. | 502/253 X |
| 2,211,022 | 8/1940 | Michael | 502/335 X |
| 2,229,199 | 1/1941 | Voorhies | 502/207 |
| 3,384,666 | 5/1968 | Lichtenwalter | 502/315 X |

*Primary Examiner*—W. J. Shine

*Attorney, Agent, or Firm*—Robert A. Kulason; Kenneth R. Priem

[57] ABSTRACT

A method for forming a pelletized catalyst having improved stability during a hydrogenation process such as the hydrogenation of a nitrile to an amine, includes the steps of mixing a metal having a melting point below about 400° C. or a hydrogen reducible compound of the low melting point metal with at least one material which is an effective hydrogenation catalyst, and then compressing the mixture to form a pellet. This pellet can then be heated in a stream of gas comprising hydrogen at a temperature above the melting point of the metal. The pellet is then cooled and can then preferably be exposed to air or other oxygen containing gases. Preferred low melting point metals include cadmium and tin. Preferred hydrogenation catalysts include nickel and cobalt either alone or with other metals and metal compounds.

5 Claims, No Drawings

STABILIZED HYDROGENATION CATALYST AND METHOD OF FORMING THE CATALYST

BACKGROUND OF THE INVENTION

This invention relates to a method for stabilizing pellets of a hydrogenation catalyst from deterioration during a hydrogenation process and more particularly, the use of a metal melting below about 400° C. for such stabilization.

Pelletized catalysts, especially those used in fixed bed type reactors, are subject to physical degradation during use. Such degradation produces fine particles which can result in the plugging of the bed and in the need for replacing the catalyst pellets even though the catalyst material is otherwise still effective.

U.S. Pat. No. 2,116,552 issued to H. Arnold sets forth a method for the preparation and use of a catalyst for the hydrogenation of carboxylic acids. The catalyst comprises a ferrous metal or their compounds wherein the ferrous metal is iron, cobalt and nickel combined with a large quantity, about 10% by weight of a low melting point metal such as cadmium which mixture has been heated at a temperature between about 300° and 400° C. and then broken up into a powder which can go through an 8 to 14 mesh or a 60 mesh. The patent sets forth the fact that such a powdered catalyst, when used for the hydrogenation of carboxylic acid, yields less by-products than a similar catalyst without the use of the low melting point metal.

A method for stabilizing pellets or tablets of a hydrogenation catalyst during use is set forth in coassigned U.S. Pat. No. 3,384,666, wherein from about 0.5 to about 1 percent of a base selected from the class consisting of the hydroxides and alkoxides of sodium, lithium and potassium are added to the hydrogenation catalyst. The hydrogenation catalyst consists primarily of a first component selected from the class consisting of nickel and cobalt, and also copper and a small amount of a nonreducible metal oxide.

U.S. Pat. No. 2,229,199 sets forth a method for preparing strong catalysts which are stable at high temperatures of the order of 900° F. and upwards by combining the catalyst, here preferably nickel, with a substantial amount of a metal oxide not reducible with hydrogen under the conditions of the reaction that the catalyst is to be used for, and a lubricant comprising graphite. The mixture is then compressed into dense lumps of a predetermined configuration, and the lumps are heated in an oxidizing atmosphere until the graphite is removed. The resulting lumps are then heated in a reducing atmosphere at a sufficiently high temperature to effect the conversion of nickel oxide to nickel. This nickel catalyst is preferably used for producing hydrogen gas by passing a hydrocarbon vapor and steam or carbon monoxide over the catalyst.

SUMMARY OF THE INVENTION

It now has been found that a pelletized catalyst having improved physical stability and resistance to degradation when used during a hydrogenation process, can be formed by mixing an effective amount of a low melting point elemental metal having a melting point below about 400° C., preferably cadmium or tin, or a hydrogen reducible compound of the metal, with at least one catalytic hydrogenation material. The mixture is compressed into a pellet or tablet of a desired size, shape and density, and then contacted with a gas comprising hydrogen at a temperature above the melting point of the metal. The pellet or tablet is then cooled to a temperature below the melting point of the metal, preferably to room temperature. The pellet is preferably contacted with a gas comprising oxygen in a controlled manner before being stored or shipped, since the reduced pellet can be pyrophoric. The finished pellet has been found to be more physically stable, that is, less likely to lose its structural integrity, when used in a hydrogenation process, such as the hydrogenation of a nitrile to an amine and more specifically the hydrogenation of acrylonitrile adducts of multifunctional amines and/or alcohols such as bis(cyanoethyl)ethylenediamine and iminodipropionitrile than the untreated pelletized catalytic hydrogenation material. The catalytic mixture which is pelletized can be made by a physical mixing or by the coprecipitation of the various salts of the desired catalytic material and metal from an aqueous solution.

PREFERRED EMBODIMENTS OF THE INVENTION

A preferred embodiment of the invention comprises forming a mixture of a known hydrogenation catalyst, such as a cobalt/copper/chromium catalyst like that specified in U.S. Pat. Nos. 4,146,560 and 3,384,666 which are incorporated herein by reference, with a low melting point metal having a melting point below about 400° C., its oxide or a compound of the metal which is reducible by hydrogen. The mixture is then pressed into at least one pellet or tablet of a desired density, size and shape, preferably a cylinder and preferably too large to pass through a No. 8 screen or sieve (a screen having a nominal opening of 2.36 millimeters). The tablet or pellet is then heated in a gas comprising hydrogen, preferably comprising hydrogen and nitrogen, to a temperature above the melting point of the metal. The tablet or pellet is then cooled below the melting point of the metal, preferably to room temperature, and preferably in a stream of an inert gas such as nitrogen. The cooled pellet is then preferably contacted in a controlled manner with a gas comprising oxygen, preferably air which acts to stabilize the formed pelletized catalyst and prevents any pyrophoric reaction on any subsequent exposures of the pellet to oxygen-containing gases. The pelletized catalyst can be successfully used in a fixed bed or other continuous flow reactor and has been found to have a much longer useful life in such a reactor, physically degrading at a much lower rate when used to hydrogenate certain nitriles to amines than the catalyst pellets, comprised of approximately 75% cobalt, 22% copper and 3% chromium, based on the weight of the metals only, as received from the manufacturer.

The preferred catalyst is comprised of a substantial portion of cobalt, a smaller proportion of copper and a minor proportion of chromium. Other well known catalysts useful for hydrogenation and preferably for the hydrogenation of a nitrile to amine can also have their physical properties, their ability to withstand degradation during hydrogenation improved by the process of the present invention. Preferred catalysts whose properties can be improved include those comprising at least one metal selected from Group VIII of the periodic table of elements and more preferably include three-compound catalysts containing from about 60 to about 85 mole percent of a first component selected from the group consisting of nickel and cobalt, from about 14 to about 37 mole percent of copper and a minor amount from about 1 to about 5 mole percent of a third non-reducible metal oxide selected from the group consisting of chromium oxide, manganese oxide, molybdenum oxide and thorium oxide. Preferably, the catalyst is comprised of from about 72 to about 78 mole percent of the first component, from about 20 to about 25 mole percent of the second component, and from about 1 to about 3 mole percent of the third component.

In another preferred embodiment of the process of the present invention, the mixture to be compressed into a pellet or tablet is formed by the aqueous precipitation of salts. In such a process, a compound of a low melting point (less than about 400° C.) metal, preferably cadmium or tin, is dissolved in water and the various components of the catalytic hydrogenation material are also formed as salts and dissolved into water. The salts used are those that when mixed will produce a precipitate, such as a carbonate, an oxide or a hydroxide, which can then be filtered from the solution and can be used to form the pelletized catalyst as set forth above. The precipitate from such a solution is preferably calcined in air so as to convert the various metal salts therein to their oxides prior to being formed into the pelletized catalyst.

In another preferred embodiment of the process of the present invention, a mixture formed by precipitation as set forth above or formed by mixing a hydrogen reducible compound of a low melting point (less than about 400° C.) metal or the metal itself with at least one material which is an effective hydrogenation catalyst such as those described above, is contacted with a gas comprising hydrogen at a temperature below the melting point of the low melting point metal but at a temperature high enough to reduce the low melting point metal compound to the elemental metal. The reduced powder is then cooled and contacted by a gas comprising oxygen, preferably air, to stabilize the mixture. The resulting partially oxidized mixture is then formed into a pellet of a desired size, shape and density by compression, preferably to a size that will not pass through a No. 8 screen or sieve. The resulting pellet is then heated to a temperature above the melting point of the low melting point metal while being contacted with an atmosphere comprising hydrogen gas. The pellet is then cooled, preferably in an inert gas, as nitrogen. The resulting cooled pellet can be used as such, or can be contacted with a gas comprising oxygen. A pelletized catalyst formed by this method is found to have a greater resistance to physical degradation when used in a hydrogenation process than a catalyst formed without the added low melting point metal and the processing steps outlined above.

A preferred hydrogen reducible compound of a metal having a melting point below about 400° C. comprises an oxide. The metal oxide can be formed from another compound of the metal, such as a carbonate, by known processes. Other hydrogen reducible compounds of the metal having a melting point below about 400° C. are also useful in the formation of the catalyst. Preferred low melting point metals include cadmium and tin. Other useful low melting point metals include bismuth, indium, lead, selenium, and thallium.

The amount of added low melting point metal, metal oxide or other hydrogen reducible metal compound comprises an effective amount which is preferably between about 5 percent and about 0.01 percent, and more preferably, between about 1 percent and about 0.01 percent by weight of the metals of the pellet. Small amounts of the metal, the oxide or other compounds are preferred, since some of the metals, as cadmium, can poison the catalyst when present in large quantities.

The mixture which is eventually pelletized can be formed by physically mixing the low melting point metal and/or its compound with the catalytic material. Alternatively, the mixture of the low melting point metal compound and the catalytic material may be formed chemically such as by co-precipitation. In a preferred method, the mixture is formed by co-precipitating the catalytic material and the low melting point metal as carbonates and then calcining the mixture at a sufficiently high temperature to transform the carbonates into oxides. The subsequent heating of the mixture with hydrogen reduces the oxides of both the low melting point metal and the catalytic material to their elemental metals.

By pelletizing the mixture, it is meant to compress, extrude, or otherwise increase the density of the mixture so that it forms a cohesive pellet or tablet having a desired size, shape and density. Preferably, the pellet will have at least one dimension, that is at least 3 milliliters, and up to about 100 milliliters or more and cannot pass through a No. 8 screen. The pellets are preferably used in a continuous reactor, wherein they form a fixed bed. The reactants can flow through the pellets and be hydrogenated through the catalytic effect of the materials within the pellets. The pellets formed by the process of the present invention can also be used for the batch hydrogenation of a nitrile or polynitrile to an amine or polyamine such as within a closed autoclave.

The hydrogenation, whether continuous or batch, can be carried out in the presence or absence of a solvent. When a solvent is used, it is preferred than an organic solvent such as an alcohol be used. Typical useful alcohols include methanol, ethanol, isopropanol, t-butanol, and n-propyl alcohol. Preferred alcohols are water-miscible.

The nitrile or polynitrile to be treated in accordance with the present invention can be chosen from a wide variety of known materials of this type. Preferred nitriles are di- and tri-nitriles prepared by reacting acrylonitrile with an amine, a polyamine, a polyhydroxymonoamine, or a polyhydroxypolyamine. Useful amines forming acrylonitrile adducts include ammonia, methylamine, piperazine, ethylenediamine, monoethanolamine, diethylenetriamine, 3-aminopropanol, N-methylethanolamine, and 2-aminoethylethanolamine. Other preferred polynitriles are those which additionally contain an oxy group such as polyoxypropyleneamines. Typically, these oxynitriles include, for example, acrylonitrile adducts of polyols such as ethylene glycol, di- and tri-ethylene glycol, glycerol, 1,1,1-tris(hydroxymethyl)ethane, butane-1,4-diol, butane1,3-diol, etc.

The hydrogenation reaction itself can be carried out over a wide range of conditions. Typically, the polynitrile is hydrogenated in the presence of hydrogen and a catalyst at a temperature within the range of from about 50° C. to about 275° C. and at a pressure of about 5 to 800 atmospheres. The reaction temperature is more preferably 70° to 150° C. with the pressure more preferably being 100 to 10,000 psig and most preferably 1000 to 3000 psig.

In a preferred embodiment, ammonia is also present during the reaction. The ammonia aids the reaction in promoting better selectivity to the primary amine, and prevents trimolecular coupling to produce secondary amine formation, usually unwanted in the reaction. When ammonia is present, usually there are from about 2 to about 20 moles of ammonia present per equivalent of nitrile. When hydrogen and ammonia are used together, the hydrogen partial pressure will usually amount to from about 60 to about 80 percent of the total pressure.

The particular space velocity of the hydrogenation reaction (grams nitrile/hour/cc catalyst) is not critical in the process. However, it is preferred to conduct the hydrogenation reaction at a velocity of between about 0.5 to about 5 grams total liquid feed/hour/cc catalyst.

The desired polyamine product can be recovered from the hydrogenation medium by conventional methods known in the art such as by distillation.

The following examples are given to illustrate the invention but are not meant to limit or otherwise restrict the invention.

EXAMPLE I

About 86 grams of a hydrogenation catalyst in pellet or tablet form comprising about 75 percent cobalt, 22 percent copper and 3 percent chromium (based on the weight of the metals only) were pulverized so as to pass through a number 80 screen. About 0.09 gram of cadmium oxide (CdO) was also pulverized so as to pass through a number 80 screen and was then added to the pulverized catalyst. The cadmium oxide, prior to the addition to the catalyst, had been calcined for about two hours at about 400° C. to remove any water and to decompose any cadmium carbonate ($CdCO_3$) present. The powders were thoroughly mixed and analysis by atomic absorption spectroscopy indicated that the catalyst was comprised of about 60 percent by weight cobalt, 13 percent by weight copper, 1.6 percent by weight chromium, about 340 parts per million by weight sodium, and about 942 parts per million by weight cadmium. The remainder of the catalyst was comprised principally of oxygen.

The mixture was then pressed into cylindrical pellets which were about 0.4 centimeter long and had a diameter of about 0.4 centimeter. The pellets were placed in the middle section of a heated vertical glass tube which had a stream of gas comprising hydrogen and nitrogen flowing through it. After initial heating, the volume of nitrogen in the gas stream was gradually reduced and the volume of hydrogen gradually increased so that hydrogen constituted the major portion of the gas stream. The maximum temperature during the reduction process was about 338° C. which was slightly above the cadmium melting point of about 321° C. The pellets were then cooled to room temperature in a stream of flowing nitrogen, and air was then gradually introduced so that after six hours air constituted the major portion of the gas flowing past the pellets. The flowing air induced a temperature rise within the pellet bed to about 52° C.

About 25 cubic centimeters of the pellets as made above were placed in a tubular reactor. A solution comprised of about 1100 grams each of bis(cyanoethyl)ethylenediamine, methanol, and ammonia were continuously charged at the rate of about 25 milliliters per hour through the tubular reactor along with about 12 liters per hour of hydrogen. The reactor was operated at a temperature of between about 110° and 120° C. and at a total pressure of about 2500 psig for about 102 hours. Analysis indicated a high conversion to bis(aminopropyl)ethylenediamine throughout the run. The used catalyst consisted of about 80 percent whole pellets with about 20 percent fine particles and broken pellets.

EXAMPLE II

Pellets of catalyst were made as in Example I, except that about 0.18 gram of cadmium oxide was used. The pellets were used as in Example I and after about 100 hours of satisfactory service, the used pellets consisted of about 90 percent intact pellets and about 10 percent fine particles.

EXAMPLE III

About 1200 milliliters of an aqueous solution comprised of about 0.62 gram of cadmium nitrate (Cd($NO_3$)$_2$.4($H_2O$), about 40 grams of chromium nitrate (Cr($NO_3$)$_3$.9($H_2O$), about 582 grams of cobalt nitrate (Co($NO_3$)$_2$.6($H_2O$) and about 80 grams of copper nitrate (Cu($NO_3$)$_2$.6($H_2O$), was heated to about 80° C. and added, simultaneously with about 270 grams of sodium carbonate ($Na_2CO_3$) dissolved in about 1250 milliliters of water also at about 80° C., to about 600 milliliters of water at about 80° C. with constant stirring. The carbonate and nitrate solutions were added at such a rate that the pH remained near 7.0 during addition. When all the nitrates had been added, about 320 milliliters of the carbonate solution remained. After stirring for about 1½ hours more at about 80° C. the solution was filtered while hot. The filter cake was stirred rapidly with about 3500 milliliters of water and refiltered. This operation was repeated three times more. The filter cake was then dried at a temperature between about 110° and 140° C. for several days. The dried filter cake was then calcined at about 400° C. for about 4 hours. The resulting powder was reduced in a flowing stream of gas comprising hydrogen and nitrogen with the nitrogen content being reduced and the hydrogen content being increased until the stream was comprised of substantially pure hydrogen at a temperature of about 300° C. The powder was then cooled under nitrogen and then subjected to a stream comprising nitrogen and air with the powder being held at a maximum temperature of about 85° C. Analysis indicated that the finished powder had a composition of about 61.3 percent by weight cobalt, 18.5 percent by weight copper, 4.08 percent by weight chromium, 0.039 percent by weight sodium and 0.20 percent by weight cadmium.

About 105 grams of the powder was mixed with about 0.6 gram of graphite and pressed into cylindrical pellets or tablets having a diameter and length of about 0.4 centimeter, respectively. The pellets were then heated at a temperature between about 332° and 368° C. in a stream of gas comprising nitrogen and hydrogen with the hydrogen being gradually increased and the nitrogen being gradually decreased until the hydrogen constituted the major portion of the gas stream. This continued for about 5½ hours. The pellets were then cooled to room temperature in a stream of nitrogen and then air was gradually introduced into the gas stream so that after about six hours air constituted the major portion of the gas stream.

The completed pellets were used in the reduction of bis(cyanoethyl)ethylenediamine as in Example I. After 76 hours of continuous operation a good yield of the hydrogenation product was achieved and the catalyst consisted of about 50 percent whole hard pellets and about 50 percent fine particles and small pieces.

EXAMPLE IV

Catalyst pellets were made as in Example I except that the cadmium oxide was replaced by a sufficient quantity of tin oxide (SnO) so that of the metals in the catalyst about 0.195 percent by weight was tin. After use for the reduction of bis(cyanoethyl)ethylenediamine for about 100 hours as in Example I, the used catalyst consisted of about 70 percent whole hard pellets and about 30 percent fine particles and small pieces.

EXAMPLE V (COMPARATIVE)

When the cobalt/copper/chromium catalyst tablets or pellets were used as received from the manufacturer in a hydrogenation process as in Example I, the flow of reactants through the reactor was stopped by extensive pellet disintegration after only about 28 hours of operation.

EXAMPLES VI THROUGH X

Catalyst pellets or tablets are made as in Example I except that the oxides of bismuth, indium, lead, selenium, and thallium are added, respectively, to the catalytic material to form the pellets. Catalysts containing these metals used in a hydrogenation of a nitrile display a useful lifetime similar to that in Examples I through IV and longer than that of the catalyst pellets as received from the manufacturer.

From Example V it can be seen that the catalyst pellets as received from the manufacturer have a very short useful lifetime when used in a fixed bed reactor for the hydrogenation of bis(cyanoethyl)ethylenediamine due to disintegration of the pellets resulting in a plugging of the reactor. However, as shown in Examples I to IV, the use of cadmium or tin in the formation of the catalyst pellets greatly increases the useful lifetime of the catalyst pellets without reducing the effectiveness of the catalyst pellets in the hydrogenation process. The addition of small quantities of low melting point metal to the catalyst is shown in Examples I to IV to produce an effective increase in the useful lifetime of the resulting catalyst pellets without adverse effects.

The above examples are for illustrative purposes only and not meant to limit the invention which is set forth in the following claims.

What is claimed is:

1. A method of forming a pelletized catalyst having improved physical stability during a hydrogenation process comprising the steps of mixing an effective amount of a low melting point metal or a hydrogen reducible compound of said low melting point metal selected from the group consisting of cadmium and tin with an effective catalytic hydrogenation material comprising cobalt, copper, and chromium, compressing the mixture to form at least one pellet, said pellet being too large to pass through a No. 8 screen, heating the pellet in a gas comprising hydrogen at a temperature above the melting point of said low melting point metal, and cooling the pellet.

2. A catalyst formed by the method of claim 1.

3. A method of forming a pelletized catalyst having improved physical stability during a hydrogenation process comprising the steps of precipitating a mixture of an effective amount of a hydrogen reducible compound of a low melting point metal selected from the group consisting of cadmium and tin and an effective catalytic hydrogenation material comprising cobalt, copper and chromium from a solution of the salts of said catalytic materal and said hydrogen reducible compound of said low melting point metal; contacting the resulting mixture with a gas comprising hydrogen at a temperature below the melting point of said low melting point metal; contacting the mixture with a gas comprising oxygen; compressing the mixture to form at least one pellet; heating the pellet in a gas comprising hydrogen at a temperature above the melting point of said low melting point metal; and cooling the pellet below the melting point of said low melting point metal.

4. The method of claim 3 and further comprising the step of calcining the precipitated mixture in air prior to contacting it with the gas comprising hydrogen.

5. The method of claim 3 wherein said pellet is too large to pass through a Number 8 screen.

* * * * *